3,507,930
PROCESS FOR OLIGOMERIZING α-OLEFINS
Walter Herwig, Frankfurt am Main, Germany, assignor to Farbwerke Hoechst Aktiengesellschaft vormals Meister Lucius & Bruning, Frankfurt am Main, Germany, a corporation of Germany
No Drawing. Filed May 15, 1967, Ser. No. 638,583
Claims priority, application Germany, May 21, 1966, F 49,258
Int. Cl. C07c 3/18, 11/02, 11/12
U.S. Cl. 260—680                                    12 Claims

ABSTRACT OF THE DISCLOSURE

α-Olefins containing up to 8 carbon atoms, or mixtures of said α-olefins, are oligomerized in the presence of a catalyst system comprising a complex of a nickel halide with a phosphoric trisdialkylamide, to which complex there has been added an organoaluminum compound which may contain chlorine.

---

The present invention relates to a process for oligomerizing α-olefins.

It is known that mixed organometallic catalysts can be used for converting α-olefins into low molecular weight products, for example dimers and trimers. In German Patent No. 1,018,857, for example, there is described a process for the manufacture of volatile polymerization products of ethylene using catalysts consisting of aluminum alkyls and titanic acid esters or zirconic acid esters.

According to German Patent 1,176,642, propylene can be dimerized by means of organo-aluminum compounds. These known processes require relatively strong process conditions, such as elevated pressures and temperatures, yielding products which generally have a very non-uniform steric configuration.

There are also known processes for the dimerization of α-olefins (for example G. Wilke, Angew. Ch., 78, page 170 (1966)), in which allyl compounds of nickel constitute the organometallic constituent of the catalyst system. These compounds are difficult to obtain on an industrial scale and their manufacture, therefore, entails considerable expense.

Now I have found a process for the preparation of oligomerization products of α-olefins containing up to 8 carbon atoms which consist preponderantly of dimers and trimers, by oligomerizing these olefins or the mixtures thereof in the presence of a catalyst comprising a transition metal, which comprises using as catalyst a mixture which comprises (1) a nickel halide complex which consists of a nickel halide, preferably nickel bromide and/or nickel chloride, and a phosphoric trisdialkylamide of the formula

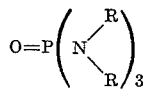

in which R represents a straight-chain or branched alkyl group containing 1 to 4 carbon atoms, preferably a methyl group, and in which the ratio of P:Ni is 2 to 3, preferably 2.0 to 2.5, and (2) an aluminum alkyl and/or an alkyl aluminum chloride.

The catalyst system to be used in accordance with the present invention, which is industrially obtained in a simple process, enables α-olefins to be converted at low pressures, at low temperatures and at a high speed to uniform oligomers and co-oligomers, preferably dimers and trimers. The catalyst system acording to the present invention can, furthermore, be used for co-dimerizing α-olefins with conjugated diolefins to dienes having terminal double bonds.

Nickel halides, especially nickel-(II)-chloride or nickel-(II)-bromide yield with phosphoric amides, such as phosphoric trisdimethylamide (PTDA), defined complexes of the formula $NiHal_2 \cdot (PTDA)_2$. The aforementioned complexes are readily soluble in aromatic solvents such as benzene, toluene or xylene. Solutions of $NiHal_2 \cdot (PTDA)$ complexes can, therefore, also be obtained direct, i.e. without isolating the complexes, by adding to a nickel halide suspension in an aromatic hydrocarbon, such as benzene, toluene or xylene, PTDA in a molar ratio of Ni:PTDA of from 1:2 to 1:3, preferably of from 1:2.0 to 1:2.5. If there are added alumino-organic compounds to the solution of these nickel complex compounds, for example triethyl aluminum, diethyl aluminum monochloride, and ethyl aluminum sesquichloride, very finely dispersed catalyst suspensions of high activity are obtained. Where ethyl aluminum sesquichloride is used it may be employed in a ratio of Ni:Al of from 1:2 to 1:20 or, more narrowly, 1:4 to 1:12.

The catalysts to be used in accordance with the present invention exhibit a particularly good efficiency. Ethylene and propylene, for example, can be dimerized under low pressures of from 4 to 12 atmospheres gage, preferably under pressures of from 5 to 7 atmospheres gage, and at temperatures within the range of from $-10°$ to $+70°$ C., preferably at temperatures within the range of from $0°$ to $+50°$ C., with a throughput of about 1 kg. α-olefin per gram Ni per hour. However, in the process according to the present invention, there may also be used pressures within the range of from 0 to 150 atmospheres gage and temperatures within the range of from $-10$ C. to $+150°$ C. to attain as high a conversion as possible. By introducing the monomers at a correspondingly higher rate of feed, i.e. under higher pressures, the reaction speed can essentially be increased. The products obtained are very uniform. For example, butene can be obtained from ethylene in a yield exceeding 90%, preferably in a yield amounting to 90 to 95%, as butene-1 and butene-2 in an approximate ratio of 1:1. Propylene is dimerized in a yield exceeding 80%, preferably in a yield amounting to 80% to 85%, the dimers consisting, for example, of hexene-2 and 4-methyl-pentene-2, in an approximate ratio of 2:1. In addition thereto, higher oligomers are obtained, such as trimers and/or low molecular weight waxes, in a yield approximating to 5 to 10%. In addition to these pure homo-dimers, there may also be prepared co-dimers; for example, ethylene can be dimerized with butadiene to yield cis-hexadiene-1,4.

The process according to the present invention can be carried out, for example, by first placing the catalyst in the dispersing agent. The α-olefin or the α-olefins are then added under the pressures as mentioned above. When the pressure has dropped, α-olefin is reintroduced under pressure, and this operation is repeated until the pressure vessel is filled with the reaction product. After the removal of the dimerizate, this operation can be repeated until the efficacy of the catalyst, which primarily depends on the purity of the monomers and of the solvent, is exhausted. However, it is also possible to carry out the process continuously by separating the dimer that has formed from the gas stream which escapes and returning the unreacted α-olefin to the reaction vessel. As indicated above, the operation may be carried out under relatively low sub-atmospheric pressure, under atmospheric or super-atmospheric pressure. It is not generally necessary to apply pressures higher than 10 atmospheres gage.

The oligomers prepared by the process according to the present invention are valuable intermediate products for the preparation of thermoplastic materials and isoprene.

The following examples serve to illustrate the invention but they are not intended to limit it thereto, the percentages being by weight.

EXAMPLE 1

3.6 cc. of ethyl aluminum sesquichloride were added, under nitrogen, to a solution of 2.3 g. [NiBr$_2$(PTDA)$_2$] in 100 cc. of toluene placed in a 1-liter glass autoclave. Into the brown catalyst suspension so obtained propylene was introduced at 0° C. at 5 atmospheres gage. The exothermic reaction set in immediately with a drop in pressure. The pressure was maintained constant at 4 to 5.5 atmospheres gage by continuously metering in the monomer; the reaction temperature was simultaneously maintained within the range of from 40° C. to 60° C. by external cooling. The experiment was interrupted after 2 hours since up to this time the reaction space was filled with oligomerization products. The catalyst was then decomposed by the addition of methanol and the total reaction product was distilled under atmospheric pressure. Within the boiling range of from 45° C. to 85° C., 750 g. of a reaction product were obtained which consisted of 58% trans-hexene-2, 9% cis-hexene-2, 18% trans-4-methyl-pentene-2, 10% cis-4-methyl-pentene-2 and 5% undefined isomers.

EXAMPLE 2

The experiment was performed in a manner analogous to that of Example 1, and ethylene was introduced into the catalyst mixture at 7.5 atmospheres gage. The reaction temperature was kept at approximately 20° C. by cooling. After 1½ to 2½ hours, dimerization was interrupted and the butene that had formed condensed in a cooling trap. The reaction was restarted, and after approximately 2 hours the butene that had formed was again removed by condensing in the cooling trap. When using very pure ethylene, dimerization could be repeated until the autoclave was filled with higher oligomers which consisted mainly of n-hexene, for example 2- and 3-n-hexene. This was the case after 10 to 12 dimerizations. The removed butene consisted of 54% butene-2 (70% trans-2-butene and 30% cis-2-butene) and of 46% butene-1.

EXAMPLE 3

1.0 g. [NiCl$_2$(PTDA)$_2$] was dissolved in 50 cc. p-xylene, and 7.2 cc. triethyl aluminum were carefully added to the solution at 0° C. The dark suspension was heated to 60° C. in a steel autoclave, and by forcing in ethylene a pressure of 50 atmospheres gage was established. The temperature was raised to 120° C. within 30 minutes, and the drop in pressure was compensated by renewed introduction of ethylene under pressure. After 1½ hours, 230 cc. of butene could be removed. The catalyst that remained in the autoclave could be used for dimerization until the reaction space was filled with higher oligomers (cf. Example 2). 71% of the butene obtained consisted of butene-1, 2.4% consisted of cis-2-butene and 7.3% consisted of trans-2-butene.

EXAMPLE 4

The experiment was performed in a manner analogous to that of Example 3 and 350 cc. propylene were added to the catalyst mixture. After 2 hours heating at 130° C., the experiment was interrupted and the autoclave cooled whereby a pressure of 0.8 atmosphere gage was established. After the catalyst had decomposed, the reaction product was distilled through an inclined film column. Under normal pressure and at a temperature of from 60° to 63° C., there were obtained 190 g. of a fraction 95% of which consisted of 2-methyl pentene-1.

EXAMPLE 5

In a 1-liter glass autoclave which contained a catalyst mixture comprising 4.6 g. [NiBr$_2$·(PTDA)$_2$] and 7.2 cc. ethyl aluminum sesquichloride in 100 cc. toluene, dimerization was started by introducing ethylene at approx. 5 atmospheres gage. During this reaction, 10 to 20 g. butadiene were introduced under pressure, at intervals of from 2 to 5 minutes, from a steel autoclave heated at 100° C. into the reaction product of the glass autoclave whose reaction temperature was kept at approximately 40° C. by cooling. After 1 hour the experiment was interrupted and, after the catalyst had been decomposed with methanol, the contents of the autoclave were distilled. By careful rectification through an inclined film column, 95 grams cis-hexadiene-1,4 could be isolated at 66.2° C. to 66.8° C.

EXAMPLE 6

1.6 cc. phosphoric acid tris-dimethylamide were added to a suspension of 0.9 g. NiBr$_2$ in 100 cc. toluene, and the suspension was stirred until a clear blue solution was obtained. Ethyl aluminum sesquichloride was added to this solution in the manner as described in Example 1, and the solution was used for the dimerization of propylene in the manner as described in Example 1.

I claim:
1. A process for the manufacture of (1) oligomers of α-mono-olefins containing up to 8 carbon atoms or (2) oligomers prepared by the co-oligomerization of α-mono-olefins containing up to 8 carbon atoms with each other or with conjugated dienes, said oligomers consisting predominantly of dimers and trimers, which process comprises conducting the oligomerization of said α-mono-olefins or mixtures thereof, or mixtures of said mono-olefins and conjugated dienes, at temperatures in the range of from −10 to +150° C. and pressures in the range of from 0 to 150 atmospheres gauge, in the presence of a mixed catalyst obtained by (a) reacting 2 to 3 moles of a phosphoric trisdialkylamide having the formula

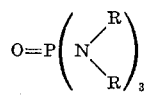

in which R represents a straight-chain or branched alkyl group containing 1 to 4 carbon atoms, with 1 mole of nickel-II-chloride or nickel-II-bromide, and then (b) adding to the complex thus formed an aluminum alkyl, an alkyl aluminum chloride, or mixtures thereof.

2. The process of claim 1, wherein the nickel halide is NiBr$_2$.

3. The process of claim 1, wherein the nickel halide is NiCl$_2$.

4. The process of claim 1, wherein the phosphoric tris-dialkylamide is phosphoric tris-dimethylamide.

5. The process of claim 1, wherein the ratio of P:Ni is 2.0 to 2.5.

6. The process of claim 1, wherein an alkyl aluminum chloride is added to the complex.

7. The process of claim 6, wherein the alkyl aluminum chloride is ethyl aluminum sesquichloride.

8. The process of claim 7, wherein ethyl aluminum sesquichloride is used in a ratio of Ni:Al of from 1:2 to 1:20.

9. The process of claim 8, wherein ethyl aluminum sesquichloride is used in a ratio of Ni:Al of from 1:4 to 1:12.

10. The process of claim 1, wherein oligomerization is carried out at 5 to 7 atmospheres gage.

11. The process of claim 1, wherein oligomerization is carried out at temperatures within the range of −10° to +70° C.

12. The process of claim 1, wherein oligomerization is carried out at temperatures within the range of 0° to 50° C.

References Cited

UNITED STATES PATENTS

| | | |
|---|---|---|
| 2,956,991 | 10/1960 | Coover et al. |
| 3,096,385 | 7/1963 | McConnell et al. |
| 3,238,265 | 3/1966 | Mueller. |
| 3,277,099 | 10/1966 | Seibt et al. |
| 3,306,948 | 2/1967 | Kealy. |
| 3,355,510 | 11/1967 | Cannell et al. |
| 3,379,706 | 4/1968 | Wilke _____ 260—683.15 X |

PAUL M. COUGHLAN, Jr., Primary Examiner

U.S. Cl. X.R.

260—683.15